Aug. 4, 1925.
R. L. DORSEY
VEGETABLE SLICER
Filed April 14, 1922
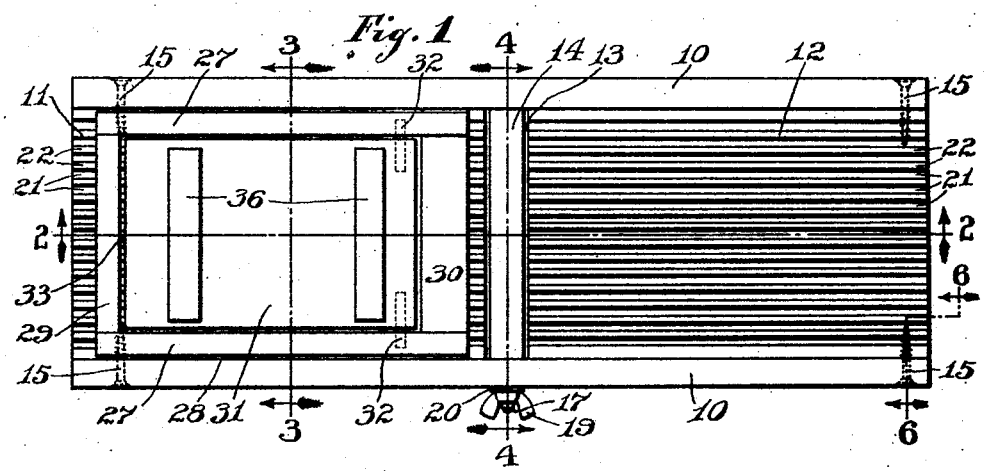
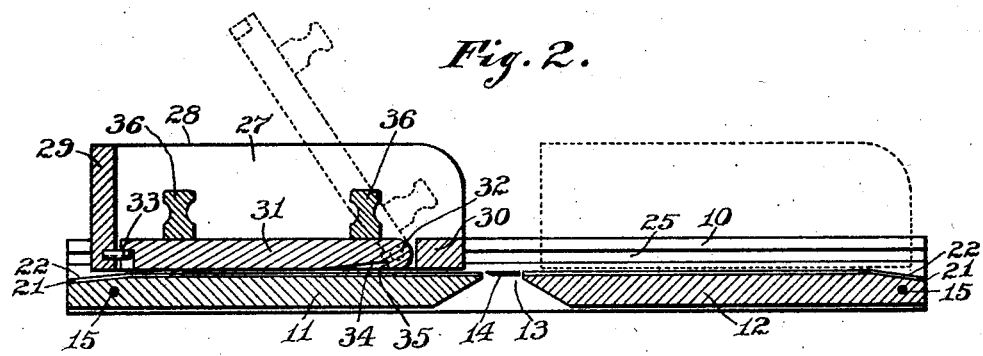
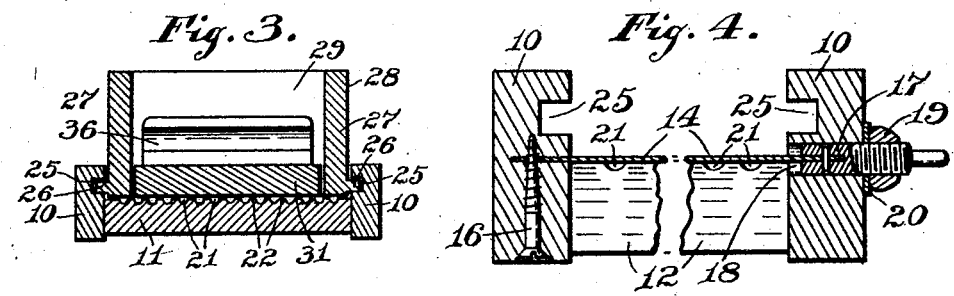
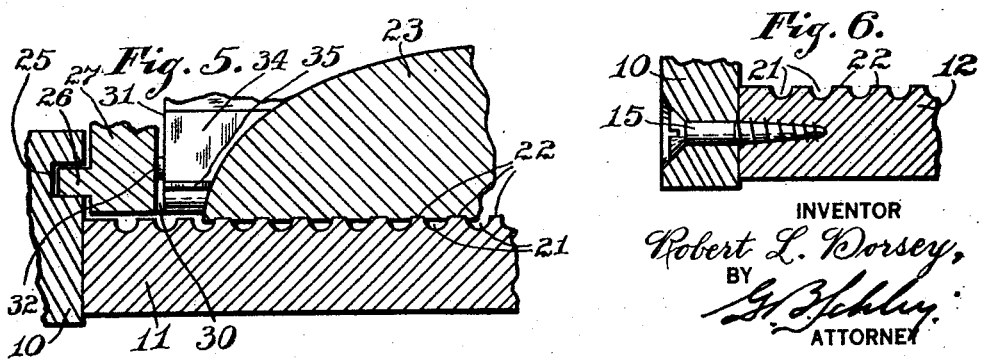
INVENTOR
Robert L. Dorsey,
BY
ATTORNEY Patented Aug. 4, 1925.

1,548,192

UNITED STATES PATENT OFFICE.

ROBERT L. DORSEY, OF INDIANAPOLIS, INDIANA, ASSIGNOR TO TUCKER & DORSEY MFG. CO., OF INDIANAPOLIS, INDIANA, A CORPORATION OF INDIANA.

VEGETABLE SLICER.

Application filed April 14, 1922. Serial No. 552,616.

*To all whom it may concern:*

Be it known that I, ROBERT L. DORSEY, a citizen of the United States, residing at Indianapolis, in the county of Marion and State of Indiana, have invented a new and useful Vegetable Slicer, of which the following is a specification.

It is the object of my invention to improve the construction and operation of vegetable slicers. More especially, its object is to make it possible to use a thin flexible slicing blade; to make the thickness of the slice readily adjustable, by adjusting the relative heights of the blade and of the cutter floor on that side of the blade toward which the edge thereof points, and to clamp the parts in adjusted position and tension the thin blade by the same means; to carry the vegetable forward and back in a slidable box, provided with a cover having a limited movement and holding the vegetable down in position to be cut, so that the fingers of the operator will not be endangered; and to construct this box so that it will have large capacity for quantity production, but will also act properly to the last thin slice on the vegetable or fruit being cut.

The accompanying drawing illustrates my invention. Fig. 1 is a plan of a vegetable cutter embodying my invention; Fig. 2 is a longitudinal section on the line 2—2 of Fig. 1; Fig. 3 is a transverse section on the line 3—3 of Fig. 1; Fig. 4 is a transverse section on the line 4—4 of Fig. 1, or in the plane of the knife; Fig. 5 is a fragmental enlarged view on the line 3—3 of Fig. 1 but looking in the direction opposite to the arrows, with the lid partly raised and a fruit or vegetable in the box; and Fig. 6 is a fragmental section, on the line 6—6 of Fig. 1.

The cutter proper has two side bars 10, between which is the cutter floor formed of two floor boards 11 and 12; and these floor boards are spaced apart at their adjacent ends to form a gap 13 in which is a knife 14. The knife 14 has its edge toward the floor board 11; and such floor board 11, and the floor board 12 also if desired, are vertically adjustable relatively to the knife 14 at their ends towards such knife. This adjustment is obtained by fastening each floor board 11 and 12 to the side bars 10 by two alined screws 15 near the outer end of such floor board, which screws 15 serve the double purpose of holding the floor boards and side bars together and of forming pivotal mountings for the respective floor boards, so that the ends of the floor boards toward the knife 14 may be swung up and down. The knife 14 is both a knife and a clamping member for the floor boards. This knife 14 is made of thin sheet metal, and is fastened at one end in one side bar 10, as by a screw 16 which passes through a hole in the end of the blade. At the other end, the knife 14 is riveted to a screw 17, which is slidable in a transverse hole 18 in the other side bar 10. The outer end of this screw 17 is provided with a wing nut 19, between which and the outer face of the co-operating side bar 10 there may be a washer 20. By loosening the wing nut 19, the ends of the floor boards 11 and 12 toward the knife blade may be swung up and down as desired. By tightening the wing nut 19, the knife 14 is tensioned, so that it is held rigid although it is a thin sheet-metal blade; and in addition the side bars 10 are pulled slightly together at their middles to clamp the floor boards in the positions to which they have been adjusted.

The upper or working faces of the floor boards 11 and 12 are preferably provided with longitudinally extending grooves 21, between which are ridges 22 upon which the fruit or vegetable 23 being sliced rides. This grooved arrangement of floor boards is claimed per se in my co-pending application Serial No. 552,617, of even filing date herewith.

The inner faces of the side bars 10 are provided with longitudinally extending grooves 25, for receiving and acting as runways for outwardly projecting carrying flanges 26 of the sides 27 of a bottomless box 28 which is slidable along the vegetable cutter. The lower edge of the sides 27 and of the front and rear cross pieces 29 and 30 of this box 28 are arranged to pass in close proximity to the top of the blade 14, the box being guided in its movements by the flanges 26 and grooves 25. A swinging cover 31 is mounted within the box 28 on alined pivot pins 32 which are close to the back cross-piece 30 of the box and also close to the bottom edges of the sides and cross piece of the box. When the cover 31 is swung downward to its limit, determined by a stop pin 33 in the front cross piece 29, its lower face is substantially flush with the lower edges of the sides and end pieces of the box and will just clear the blade 14. This lower face of the cover 31 is provided with a transverse notch 34 extending entirely across it near the pivots 32. The forward side of this notch 34 is oblique, but the rear side is square to form a shoulder 35 which when the cover 31 is swung down to or near its lowermost position acts against the edge of the fruit or vegetable being cut to draw the latter back on the non-cutting stroke of the box even when there is only a thin piece of fruit or vegetable yet remaining unsliced. The upper face of the cover 31 may be provided with cross bars 36, to be gripped by the fingers of the operator.

The length of the cover 31 is greater than the depth of the box, so that when the cover is upraised it projects above the box and serves as a shoulder against which several superposed vegetables may bear when placed on top of one another in the box. This is especially desirable for quantity production of sliced material, even when the cover is not used for its other functions; and greatly increases the capacity of the cutter.

In operation, the rear floor-board 12 is usually adjusted so that the upper edges of the ridges 22 are substantially flush with the knife 14; and the front floor-board 11 is adjusted to give the desired thickness to the sliced fruit or vegetable. Then the knife 14 is tensioned by the wing nut 19 to stiffen it and to clamp the floor boards in adjusted positions.

Then, the box 28 being in sliding relation to the bars 10 by the co-operation of the flanges 26 and the grooves 25, the fruit or vegetable to be sliced is placed in the box between the upraised cover 31 and the front cross-piece 29, resting on the floor board and against the front cross-piece 29. The operator then swings the cover 31 down over the vegetable and grasps the box by the front cross-piece 29, and by one of the cross bars 36 if desired, and reciprocates the box along the cutter. For quantity production, several fruits or vegetables may be placed on top of one another in the box, the cover being upraised to serve as a shoulder for them to bear against; and as these are sliced away others may be placed in the box in top of them, to keep the box always more or less filled.

At each stroke in one direction, the knife 14 takes a slice from the bottom of the fruit or vegetable, the vegetable being pushed forward by the front cross-piece 29 or by the hand and being drawn backward with the box by the action of the cover 31. As the fruit or vegetable is sliced, the cover 31 may be swung downward to hold the vegetable firm. This is by gravity with or without the assistance of pressure from the operator's hand. When the unsliced remainder of the fruit or vegetable gets thin, so that the cover 31 is approaching its lower limit of movement, the shoulder 35 comes into play to act on the edge of such unsliced remainder to take it backward across the knife 14.

In this way the entire fruit or vegetable may be sliced without endangering the fingers of the operator. The slicing, and the action of the shoulder 35, are much facilitated by the grooves 21, which serve both to reduce the friction of operation, and to admit air beneath the unsliced part of the vegetable or fruit, thus preventing it from sticking.

I claim as my invention:

1. A vegetable cutter, comprising two side bars, a floor between said two side bars, said floor having a gap in it, a knife extending between said side bars at said gap, said floor at the gap on the edge side of said knife being vertically adjustable with respect to the knife, and means for tensioning said knife to clamp said floor in adjusted position.

2. A vegetable cutter, comprising two side bars, two floor boards located between said side bars with a gap between them, a flexible knife blade extending from one side bar to the other at said gap, the floor board toward which the edge of said knife points being pivotally mounted on a transverse axis to permit its end toward said knife to be tilted up or down, and means co-operating with said knife and side bars for tensioning the knife and clamping said tiltable floor board in adjusted position between the side bars.

3. A vegetable cutter, comprising two side bars, two floor boards located between said side bars with a gap between them, a flexible knife blade extending from one side bar to the other at said gap, each of said floor boards being pivotally mounted on a transverse axis to permit its end toward said knife to be tilted up or down, and means co-operating with said knife and side bars for tensioning the knife and clamping said tiltable floor boards in adjusted position between the side bars.

In witness whereof, I have hereunto set my hand at Indianapolis, Indiana, this 12th day of April, A. D. one thousand nine hundred and twenty-two.

ROBERT L. DORSEY.